US011699066B2

(12) United States Patent
Gonzalez Aguirre

(10) Patent No.: US 11,699,066 B2
(45) Date of Patent: Jul. 11, 2023

(54) METHODS AND APPARATUS TO DETECT PHYSICAL CHANGES IN AN ENVIRONMENT

(71) Applicant: Intel Corporation, Santa Clara, CA (US)

(72) Inventor: David Gonzalez Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 16/586,454

(22) Filed: Sep. 27, 2019

(65) Prior Publication Data

US 2020/0026984 A1  Jan. 23, 2020

(51) Int. Cl.
*G01S 15/89* (2006.01)
*G06N 3/045* (2023.01)
*G06N 3/088* (2023.01)
*G05D 1/02* (2020.01)

(52) U.S. Cl.
CPC .............. *G06N 3/045* (2023.01); *G01S 15/89* (2013.01); *G05D 1/0255* (2013.01); *G06N 3/088* (2013.01); *G05D 2201/0203* (2013.01)

(58) Field of Classification Search
CPC ...... G06N 3/0454; G06N 3/088; G01S 15/89; G01S 7/527; G05D 1/0255
USPC .......................................................... 367/87
See application file for complete search history.

(56) References Cited

U.S. PATENT DOCUMENTS

| 2016/0292589 | A1* | 10/2016 | Taylor, Jr. | ............... | G06T 9/002 |
| 2019/0097865 | A1* | 3/2019 | Xu | ........ | A61B 5/4809 |
| 2020/0082245 | A1* | 3/2020 | Hao | ....................... | G06N 3/084 |
| 2020/0309930 | A1* | 10/2020 | Zhou | .................... | G06V 40/172 |
| 2021/0082208 | A1* | 3/2021 | Surace | ................ | G08G 5/0013 |

OTHER PUBLICATIONS

Chen et al. "RevisitingWinner Take All (WTA) Hashing for Sparse Datasets" available at https://arxiv.org/abs/1612.01834, 2016 (9 pages).
Mahapatra et al. "S-Isomap++: Multi Manifold Learning from Streaming Data" available at https://arxiv.org/abs/1710 06462. 2017(11 pages).

(Continued)

*Primary Examiner* — Gordon G Liu
(74) *Attorney, Agent, or Firm* — Hanley, Flight & Zimmerman, LLC

(57) ABSTRACT

Methods, apparatus, systems and articles of manufacture to detect changes in a physical environment are disclosed. An example apparatus includes a descriptor generator to generate a first descriptor, the descriptor generator including: a chirp producer to emit a chirp into the environment, a chirp recorder to record a response to the chirp from the environment, and a chirp response encoder to generate an encoding of the response to the chirp; a descriptor similarity generator to generate a similarity value, the similarity value to compare the first descriptor to a second descriptor; and a physical change indicator to, in response to the similarity value exceeding a similarity threshold, indicate that a physical change has occurred in the environment.

26 Claims, 10 Drawing Sheets

(56) References Cited

OTHER PUBLICATIONS

Charte et al. "A practical tutorial on autoencoders for nonlinear feature fusion:Taxonomy, models, software and guidelines" available at https://arxiv.org/abs/1801.01586, 2018 (24 pages).
Zhao et al. "Locality Preserving Hashing" available at https://www.aaai.org/ocs/index.php/AAAI/AAAI14/paper/view/8357, 2014 (7 pages).
Shum et al. "The Basics of Audio Fingerprinting" available at https://people.csail.mit.edu/sshum/talksaudio_fingerprinting_sis_24Oct2011.pdf, 2011 (44 pages).
Tontechnik-Rechner "Calculation speed of sound in humid air" available http://www.sengpielaudio.com/calculator-airpressure.htm (8 pages).
Bullinaria, "Self Organizing Maps: Fundamentals" available at http://www.cs.bham.ac.uk/~jxb/NN/l16.pdf, 2014 (15 pages).
Ventura, "Manifold Learning Examples { PCA, LLE and ISOMAP" available at http://axon.cs.byu.edu/Dan/678/miscellaneous/Manifold.example.pdf, 2018, (9 pages).
Erickson et al. "Multimodal execution monitoring for anomaly detection during robot manipulation" available at https://ieeexplore.ieee.org/document/7487160, 2009 (3 pages).
Hornung et al. "OctoMap: an efficient probabilistic 3D mapping framework based on octrees" available at https://dl.acm.org/citation.cfm?id=2458796, 2013 (2 pages).
Taketomi et al. "Visual SLAM algorithms: a survey from 2010 to 2016" available at https://ipsjcva.springeropen.com/articles/10.1186/s41 074-017-0027-2, 2017 (11 pages).
Moustafa et al. "Towards Truly Ubiquitous Indoor Localization on a Worldwide Scale" available at https://dl.acm.org/citation.cfm?doid=2820783.2820883, 2015 (2 pages).

\* cited by examiner

METHODS AND APPARATUS TO DETECT PHYSICAL CHANGES IN AN ENVIRONMENT

FIELD OF THE DISCLOSURE

This disclosure relates generally to environmental sensing, and, more particularly, methods and apparatus to detect physical changes in an environment.

BACKGROUND

In recent years, omnidirectional environmental modification detection has become useful in applications such as service robots, immersive gaming, and surveillance to reliably detect and respond to changes in an environment. For example, a surveillance system could continuously monitor a bounded (e.g., indoor) space for physical changes and, in response to a physical change, notify a user of the physical change.

Figure 1:
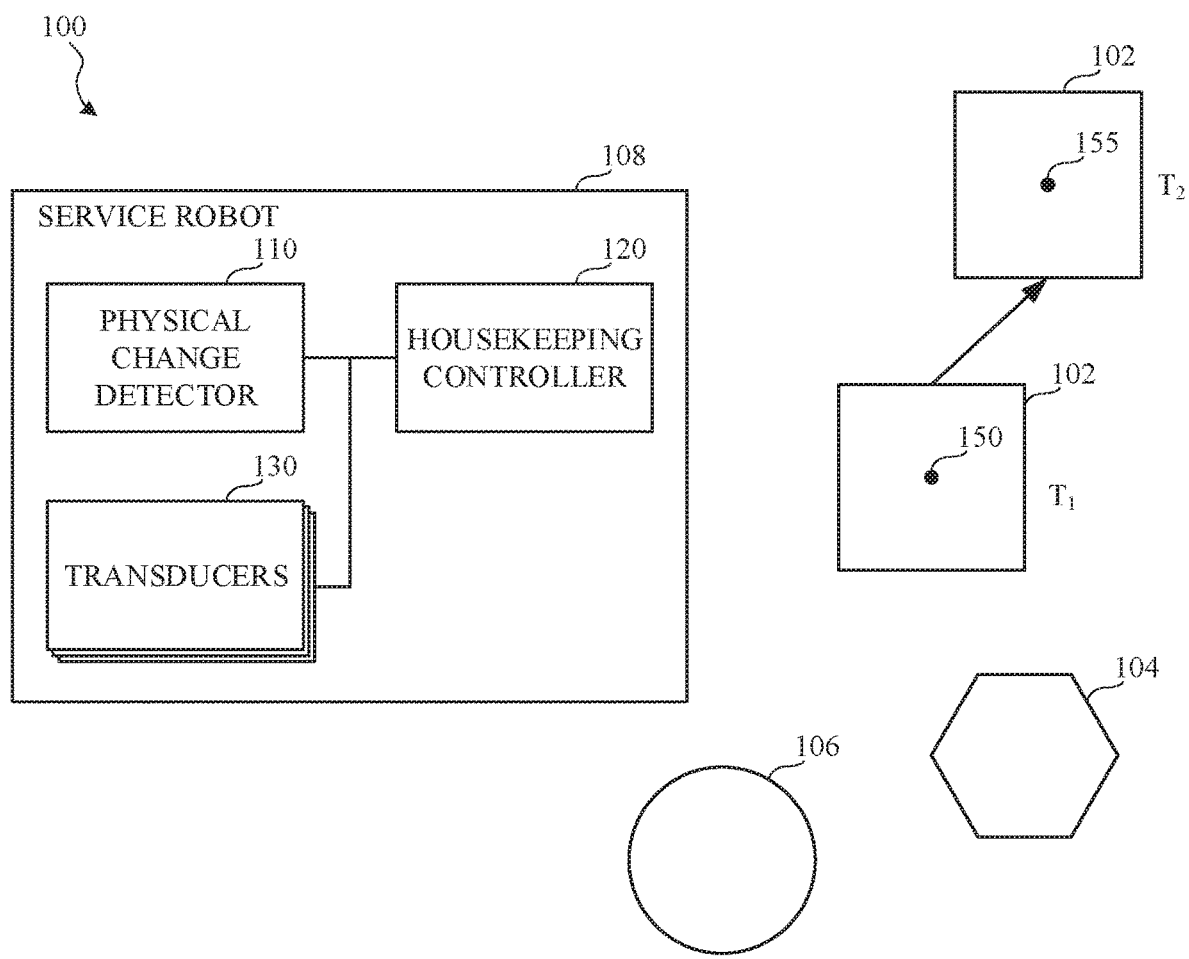
FIG. 1 depicts an example environment of use including an example service robot to maintain cleanliness of the environment.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The integrated perceptual skill for rapid omnidirectional environmental modification detection in human-centric (e.g., semi-structured, household-like, etc.) environments empowers a wide range of applications such as service robots, intelligent surveillance, immersive gaming, teleoperation via virtual reality (VR) or augmented reality (AR), education, and entertainment. Such applications reliably assert indoor physical changes to an environment when a change has been detected. Applications sensing changes in an environment may plan, adapt, and eventually execute coping actions for each scenario and task-specific directives as exploration, modifications actualization, remodeling occupancy and geometric representation, etc.

The robot's perceptual capability to robustly determine if a bounded-space, such as a bedroom or living room, has been physically modified by people, animals, or other actors is valuable for smart-spaces, immersive applications and robot-based service systems. Environment change detection is particularly interesting in use cases where robots are responsible for facility management, housekeeping, security monitoring, and asset placement checking, and environment change detection directly impacts business or application domains such as physical augmentation of perceptual interfaces for VR or AR.

In such domains, ambient service robots may be in charge of organizing, cleaning, guarding, and monitoring diverse premises types such as hotels, homes, hospital, schools, etc. Robots and system instrumentations do not need to be forced to fully traverse and visually record the entire contents of a room to determine whether a subtle change in the environment occurred. In other words, autonomous service robots and intelligent spaces may avoid compulsory scene scanning by a large number of sampling acquisition locations using on-board sensors each with several viewpoints to detect whether a measurable change has occurred. When a service robot detects a change in the environment, the robot may proceed to execute corresponding contingency services or maintenance actions.

FIG. 1 depicts an example environment 100 including an example service robot to maintain cleanliness of the environment. The environment 100 of FIG. 1 includes an example first object 102, an example second object 104, and an example third object 106 to be monitored at a first time ($T_1$). The environment 100 further includes an example service robot 108. The first object 102 has a first location 150 in the environment 100 and at a second time ($T_2$) the first object 102 has a second location 155. In the examples of FIG. 1, the environment 100 contains three objects 102, 104, 106 to be monitored. However, any number of objects to be monitored may be included in the example environment 100.

In the examples of FIG. 1, the objects 102, 104, 106 are household objects in the environment 100 to be monitored by the service robot 108. For example, the objects 102, 104, 106 may include pieces of furniture (such as chairs, tables, sofas, etc.) in a room. The objects 102, 104, 106 may further include objects such as plates, cups, cans of food, etc. However, the objects 102, 104, 106 in the environment 100 may include any moveable objects that the service robot 108 monitors for changes. In the examples of FIG. 1, the objects 102, 104, 106 are three different types of objects. For example, the first object 102 may be a chair, the second object 104 may be a toy, and the third object 106 may be a potted plant. However, the objects 102, 104, 106 may be any type of object. For example, the first object 102, the second object 104, and the third object 106 may each be a chair.

If the service robot 108 detects a change in the environment 100 (e.g., the first object 102 is moved from the first location 150 to the second location 155), the service robot 108 may attempt to housekeep the environment 100 by relocating the first object 102. For example, if a user moves the first object 102 from the first location 150 at the first time $(T_1)$ to the second location 155 at the second time $(T_2)$, the service robot 108 may move the first object 102 to the first location 150 at a third time.

The service robot 108 includes an example physical change detector 110, an example housekeeping controller 120, and example transducers 130. The service robot 108 may monitor and update areas in an environment. For example, the service robot 108 may navigate to a room in a household, determine whether a room has changed over a period of time, and, in response to determining that a room has changed, move objects in the room to restore the room to a previous state. The service robot 108 may navigate to and monitor multiple areas (e.g., rooms in a household).

The physical change detector 110 detects and whether the environment 110 has changed. For example, once the first object 102 has moved from the first location 150 to the second location 155, the physical change detector 110 will detect that the environment 100 has changed. The physical change detector 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

The example of FIG. 1 relates to a housekeeping service robot and, as such, the housekeeping controller 120 modifies the environment 100 to keep the environment 100 clean. For example, if the first object 102 is moved from the first location 150 to the second location 155, the housekeeping controller 120 will relocate the first object 102. In some examples, the housekeeping controller 120 may relocate the first object 102 back to the first location 150. In other examples, the housekeeping controller 120 may relocate the first object 102 to a third location. The housekeeping controller 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

The transducers 130 capture information regarding the environment 100. In examples disclosed herein, the transducers 130 capture information about the environment 100 such as sound (e.g. via a microphone), temperature, pressure, and relative humidity. However, any other information about the environment 100 may additionally and/or alternatively be captured. Further, the transducers 130 transmit information into the environment 100. For example, the transducers 130 emit sound (e.g., via a speaker) into the environment 100. The transducers 130 of the illustrated example of FIG. 1 are implemented by a logic circuit such as, for example, a field-programmable gate array (FPGA). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

Figure 2:
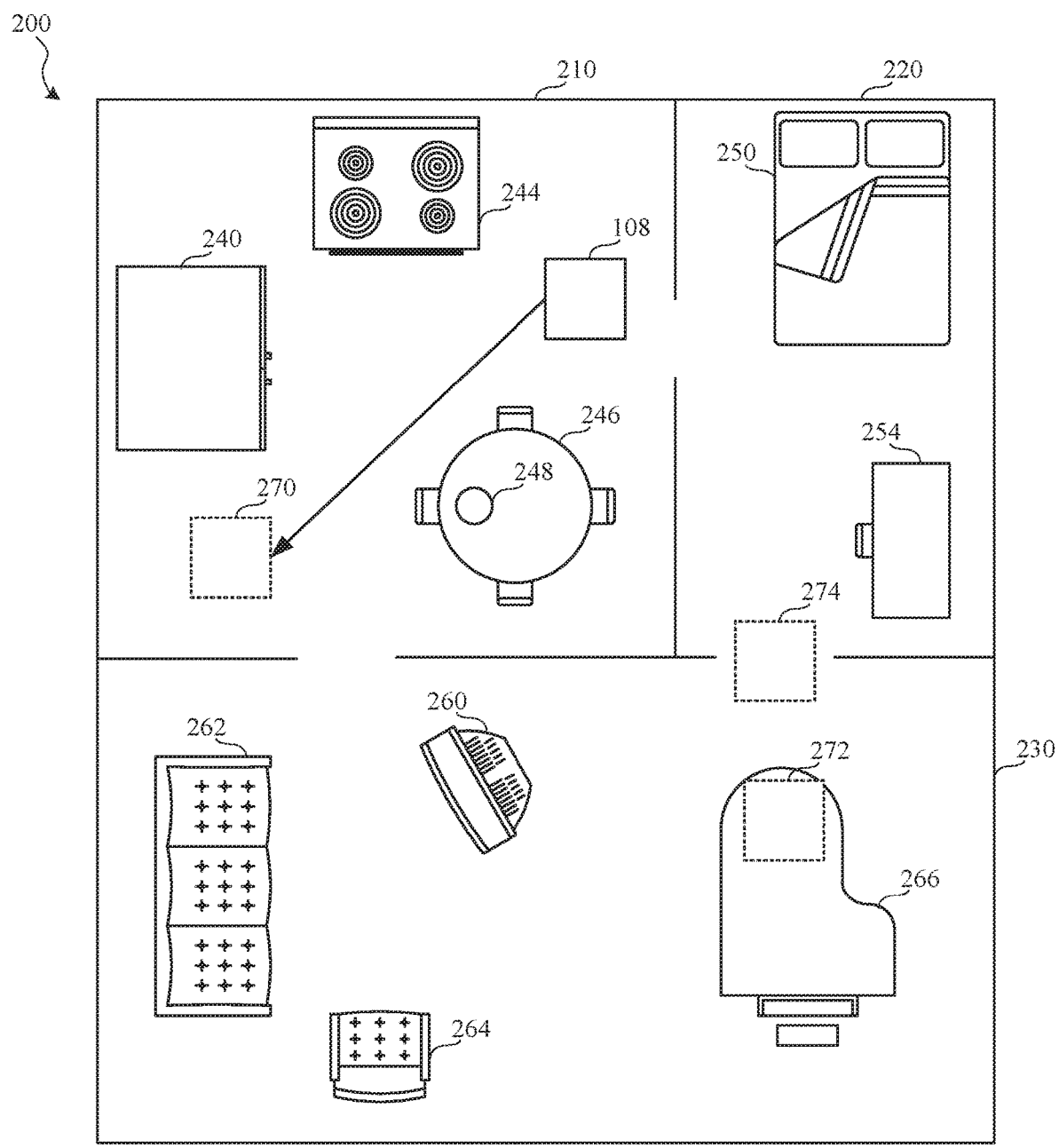
FIG. 2 depicts an example environment of use including a floor plan of the environment and the service robot of FIG. 1.

FIG. 2 depicts an example environment 200 of use including a floor plan of the environment and the service robot 108 of FIG. 1. The environment 200 includes an example kitchen 210, an example bedroom 220, and an example living room 230. However, any number of rooms may be included in the environment 200. For example, the environment 200 may include only the kitchen 210. In another example, the environment 200 may include five rooms. While in the example illustrated in FIG. 2 the environment 200 is a house, other environments may additionally or alternatively be used. For example, the environment 200 may include a house and a garage. In another example, the environment may be an office or a factory.

The kitchen 210 includes a refrigerator 240, a stove 244, and a table set 246, and a plate 248. The bedroom 220 includes a bed 250 and a desk 254. The living room 230 includes a television 260, a sofa 262, a chair 264, and a piano 266. In other examples, each room (such as the kitchen 210, the bedroom 220, the living room 230, etc.) may include any number of objects. For example, the living room 230 may include the sofa 262 and a second sofa.

In examples discussed herein, the service robot 108 navigates throughout the environment 200 using a topological map. The topological map includes nodes that may represent a room in the environment 200. For example, the topological map may include a node representing the bedroom 220. In order to detect a change in the environment (e.g., the plate 248 changes location from the table set 246 in the kitchen 210 to the living room 230), the service robot may generate descriptors of a room.

Figure 3:
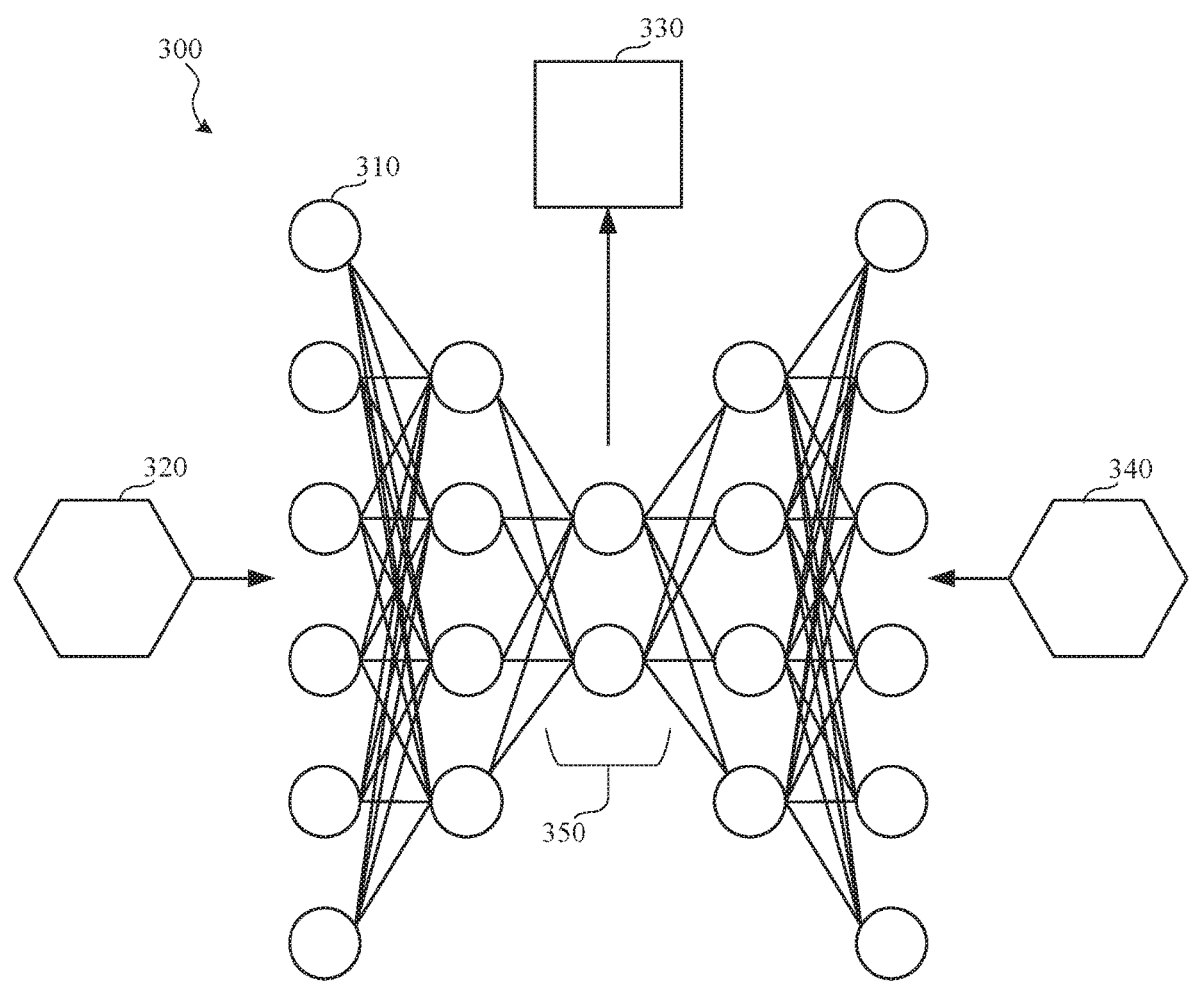
FIG. 3 depicts an example machine learning model to encode a descriptor.

FIG. 3 depicts an example machine learning model to encode a chirp response. As used herein, the term "chirp," and variations thereof, encompasses one or more audio signals that include a plurality of modulating frequency bands, where the frequency bands may create spectral gaps in each audio signal in the chirp. As used herein, the phrase "encoded chirp response," and variations thereof, encompasses a recorded response to at least one chirp projected into an environment that has been encoded using a machine learning model.

In examples disclosed herein, a neural network model is used for the machine learning model to encode a chirp response. Using a neural network model enables the encoding of chirp recordings. In general, machine learning models/architectures that are suitable to use in the example approaches disclosed herein will be an auto-encoder neural network with an undercomplete topology. An example machine learning model 300 is illustrated in FIG. 3. The machine learning model 300 of FIG. 3 includes connected example neurons 310, an example input 320, an example encoded chirp response 330, and an example output 340. In examples described herein, the input 320 and the output 340 are recordings of a response to an audio chirp. However, any other input or output may additionally or alternatively be used. For example, the input 320 or the output 340 may be images.

An auto-encoder neural network has a symmetric structure with respect to dimensionality at the input and output ends, and in general is utilized to produce an output nearly identical to an input. For example, after the machine learning model 300 has been trained, the machine learning model 300 may produce an output 340 that resembles a given input 320. A neural network with an undercomplete topology such as the machine learning model 300 of FIG. 3 has fewer neurons in the central layers compared to layers near the input layer. However, other types of machine learning models could additionally or alternatively be used. Because the machine learning model 300 includes an auto-encoder neural network architecture, a signal embedded representation may be observed at the middle 350 of the signal propagation path. In other words, an encoded chirp response 330 is generated at the middle 350 of the machine learning model 300.

In examples discussed herein, the machine learning model 300 is trained via unsupervised learning. The machine learning model 300 uses a predetermined set of example inputs and attempts to produce an output that resembles a given input. However, any other methods to train the machine learning model 300 may additionally or alternatively be used.

The encoded chirp response 330 includes characteristics that are different from the characteristics of the input 320 or the output 340, and the generated encoded chirp response is an embedded representation of the input 320. In other words, the encoded chirp response 330 retains fewer dimensions than that of the input 320, but the properties of the encoded chirp response correspond to the input 320. If a first input and similar second input are supplied to the machine learning model 300, a first encoded chirp response corresponding to the first input and a second encoded chirp response corresponding to the second input will also be similar. The differences between the first encoded chirp response and the second encoded chirp response may be measured with greater efficiency than measuring the differences between the first input and the second input.

Figure 4:
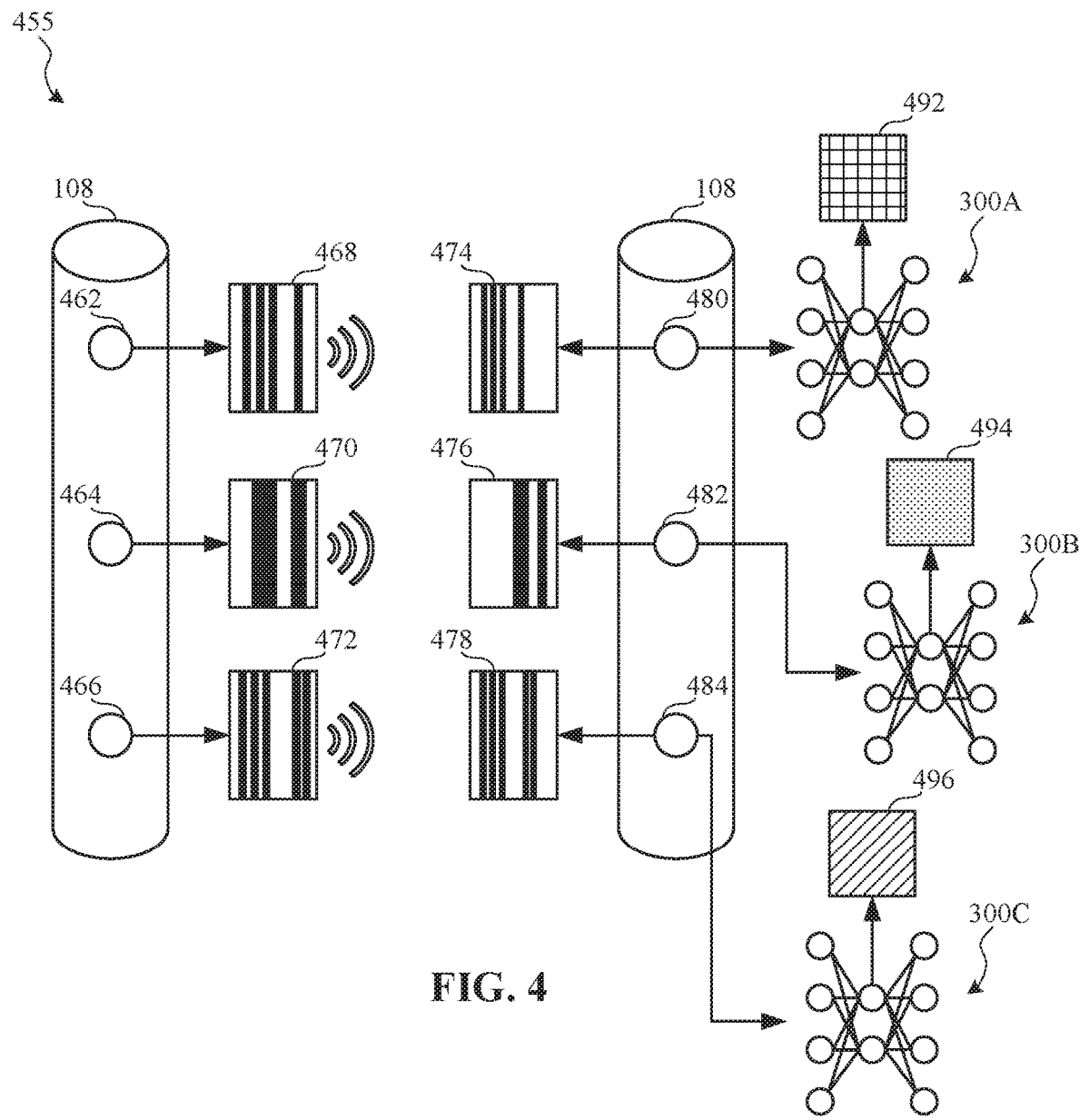
FIG. 4 depicts the example service robot of FIG. 1 projecting chirps into an environment and encoding the responses.

FIG. 4 depicts the example service robot of FIG. 1 projecting chirps into an environment and encoding the responses. The environment 455 of FIG. 4 includes the service robot 108 that includes a first speaker 462, a second speaker 464, and a third speaker 466. The environment 455 further includes a first chirp 468, a second chirp 470, and a third chirp 472 to be emitted into the environment 455. Each speaker included in the service robot 108 corresponds to a chirp. The first speaker 462 emits the first chirp 468 into the environment 455, the second speaker 464 emits the second chirp 470 into the environment 455, and the third speaker 466 emits the third chirp 472 into the environment 455. In examples described within, each chirp is emitted over three separate periods of time. For example, after the first chirp 468 is emitted by the first speaker 462, the service robot 108 may delay a period of time until the second speaker 464 emits the second chirp 470, and then the service robot 108 may delay a period of time until the third speaker 466 emits the third chirp 472. However, the chirps may be emitted at any period of time.

In the example illustrated in FIG. 4, the service robot 108 includes three speakers. However, any number of speakers may be included in the service robot 108. Further, in the example illustrated in FIG. 4, each speaker corresponds to one chirp. However, a speaker can correspond to any number of chirps. For example, the first speaker 462 may emit the first chirp 468 into the environment, delay for a period of time, and then emit the second chirp 470 into the environment.

After a chirp has been emitted into the environment 455, the chirp response is recorded by the service robot. The environment 455 includes a first chirp response 474, a second chirp response 476, and a third chirp response 478. Each chirp response corresponds to the change to an emitted chirp by objects in the environment. The first chirp response 474 corresponds to the emission of the first chirp 468, the second chirp response 476 corresponds to the emission of the second chirp 470, and the third chirp response 478 corresponds to the emission of the third chirp 472.

The service robot 108 includes a first microphone 480, a second microphone 482, and third microphone 484. Each microphone records a corresponding chirp response. The first microphone 480 records the first chirp response 474, the second microphone 482 records the second chirp response 476, and the third microphone 484 records the third chirp response 478. However, a microphone can correspond to any number of chirp responses. For example, the first microphone 480 may record the first chirp response 474, and then, in response to the emission of the second chirp 470 by the second speaker 464, record the second chirp response 476.

The service robot 108 includes a first auto-encoder 300A, a second auto-encoder 300B, and a third auto-encoder 300C. Each auto-encoder creates an encoded chirp response corresponding to a chirp response recorded by a speaker. The first auto-encoder 300A creates a first encoded chirp response 492 using the first chirp response 474, the second auto-encoder 300B creates a second encoded chirp response 494 using the second chirp response 476, and the third auto-encoder 300C creates a third encoded chirp response 496 using the third chirp response 478. In some examples, each auto-encoder corresponds to a chirp response and the corresponding chirp. For example, the first auto-encoder 300A corresponds to the first chirp response 474 and corresponds to the first chirp 468. In other examples, each auto-encoder corresponds to a microphone and the chirp responses corresponding to the microphone. For example, if the first microphone 480 records the first chirp response 474 and the second chirp response 476, the first auto-encoder 300A corresponds to the first chirp response 474 and the second chirp response 476.

Figure 5:
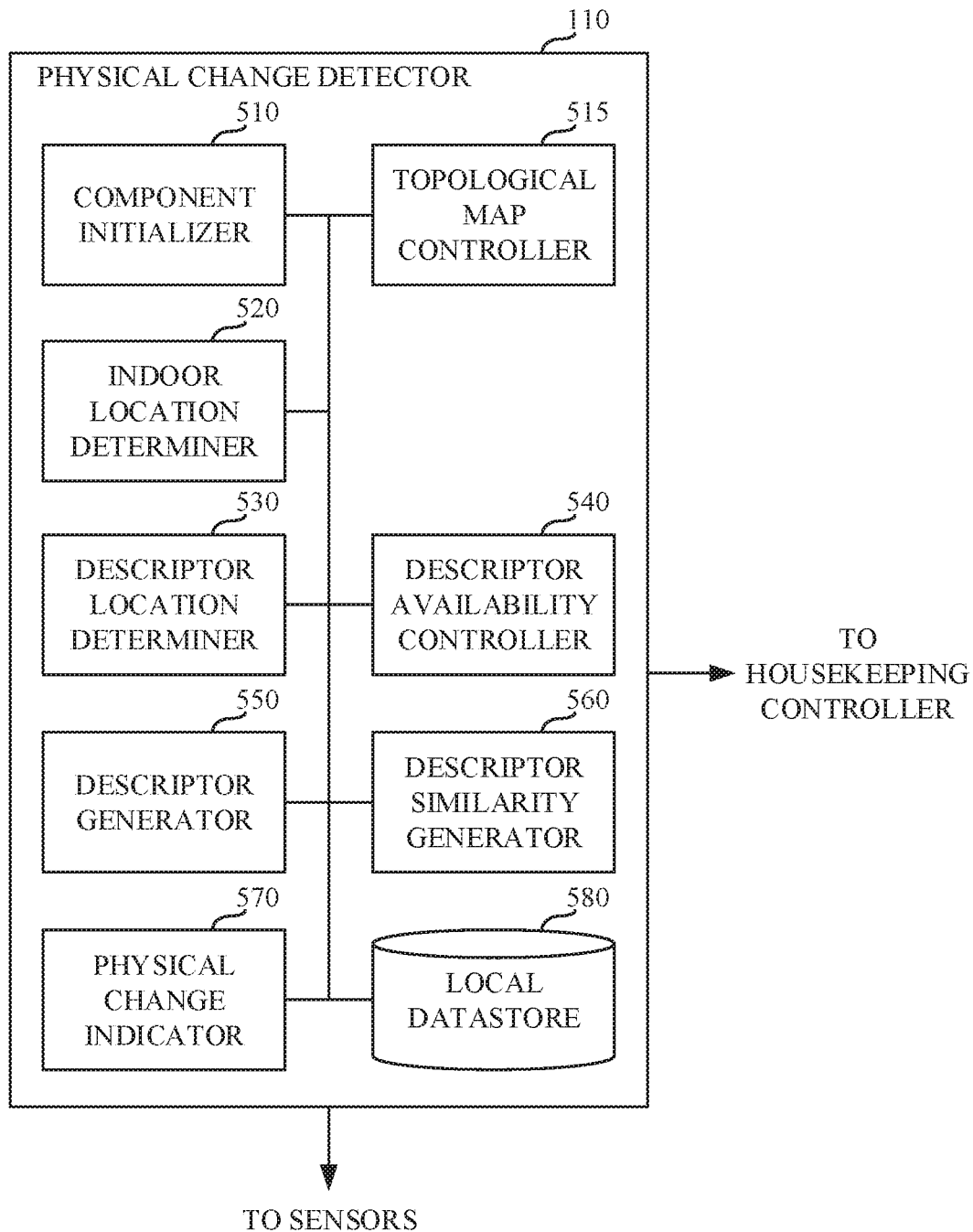
FIG. 5 is a block diagram of an example physical change detector to detect and indicate changes in an environment.

FIG. 5 is a block diagram of an example physical change detector 110 to detect and indicate changes in an environment. The physical change detector 110 of FIG. 5 includes an example component initializer 510, an example topological map controller 515, an example indoor location determiner 520, an example descriptor location determiner 530, an example descriptor availability controller 540, an example descriptor generator 550, an example descriptor similarity generator 560, an example physical change indicator 570, and an example local datastore 580.

The component initializer 510 initializes components of the physical change detector 110 to default states. In examples disclosed herein, the component initializer generates a topological map of the environment in which the physical change detector 110 is located, generates a set of chirps to be projected outward into the environment, trains a first machine learning model (e.g., a neural network auto-encoder model) to encode chirp recordings, and trains a second machine learning model to calculate a similarity between a first descriptor and a second descriptor. However, any other initialization methods or processes can additionally and/or alternatively be used.

As previously mentioned, in examples discussed herein, an auto-encoder neural network is used for the first machine learning model. In examples disclosed herein, a manifold learning model is used for the second machine learning model. Manifold learning machine models may be used to reduce data inputs with many dimensions into corresponding outputs with fewer dimensions. Using a manifold learning model enables the calculation of similarity between descriptors. For example, a manifold machine learning model enables a similarity generator to determine a distance between two high-dimension inputs with greater speed by reducing the number of dimensions to analyze. In general, machine learning models/architectures that are suitable to use in the example approaches disclosed herein will be an isometric mapping process. However, other types of machine learning models could additionally or alternatively be used (e.g., linear local embedding, self-organizing map, etc.). In examples discussed herein, the manifold machine learning model is trained via unsupervised learning using a predetermined set of example descriptors as inputs. However, any other methods to train the machine learning model may additionally or alternatively be used.

The component initializer 510 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The topological map controller 515 generates a topological map of the environment in which the physical change detector 110 is located. For example, if the service robot 108 is located within an environment 200 with a kitchen 210, a bedroom 220, and a living room 230, the topological map controller 515 may generate a topological map with a first node representing the kitchen 210, a second node representing the bedroom 220, and a third node representing the living room 230. However, any other methods to represent the environment 200 may additionally or alternatively be used. For example, the topological map controller 515 may represent the living room 230 with a first node and a second node, the first node representing the left side of the living room 230 and the second node representing the right side of the living room.

In examples discussed herein, the topological map controller 515 generates a topological map using a Simultaneous Localization and Mapping (SLAM) process. For example, a visual-based SLAM process may construct a map of an environment via camera sensor information. The map may be a three-dimensional volumetric map of the space (e.g., a three-dimensional map of the bedroom 220). However, any other methods to construction a topological map of an environment may additionally or alternatively be used. For example, the topological map may be provided by a remote server and accessed by the topological map controller 515 via a network such as the Internet.

The topological map controller 515 determines whether the current location retrieved by the indoor location determiner 520 is located in a node in the topological map. For example, the topological map controller 515 may determine that the service robot 108 is located inside the kitchen 210. The topological map controller 515 may also determine whether the service robot is located in a descriptor location or determine a path for the service robot to navigate to a descriptor location. For example, the topological map controller 515 may determine that the service robot is located in the kitchen 210 but not located in the descriptor location 270.

The topological map controller 515 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The indoor location determiner 520 retrieves the current location of the physical change detector 110. In some examples, the current location of the physical change detector 110 is determined using Global Positioning System (GPS) coordinates. In other examples, the current location of the physical change detector 110 is retrieved using dead reckoning. However, any other methods to retrieve the current location of the physical change detector 110 may additionally and/or alternatively be used. The indoor location determiner 520 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The descriptor location determiner 530 determines a location at which a descriptor may be generated. As used herein, the phrase "descriptor," and variations thereof, encompasses an encoded response of a room to an audio signal (i.e., an encoded chirp response) in addition to the local weather (humidity, temperature, pressure, etc.) of the room. In examples described within, a descriptor includes a single encoded response of a room to a chirp. However, any number of encoded chirp responses may be included in a descriptor. For example, the service robot 108 may emit three chirps into the environment, generate three encoded chirp responses each corresponding to a chirp, and generate a descriptor that includes each of the three encoded chirp responses. A descriptor may also include other properties of a room that affect audio responses, such as temperature, humidity, pressure, etc.

The service robot 108 identifies a descriptor location to generate a descriptor corresponding to a topological node. For example, the service robot 108 may identify a first descriptor location 270 at which to generate a descriptor for the kitchen 210. Descriptor locations may be chosen by identifying areas that do not contain objects. For example, the service robot 108 may not choose a second descriptor location 272 because the descriptor location 272 is within the piano 266. However, any other methods or criteria for selecting a descriptor location may additionally or alternatively be used. For example, the service robot 108 may not choose a third descriptor location 274 because the descriptor location 274 is located within a doorway.

In some examples, the descriptor location determiner 530 prioritizes nearby locations that are reachable by the system and locations that are not labeled for special usages. In other examples, the descriptor location determiner 530 selects a descriptor location from a predetermined list of descriptor locations that is nearest to the current location of the physical change detector 110. However, other methods for selecting a descriptor location may additionally and/or alternatively be used. The descriptor location determiner 530 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The descriptor availability controller 540 determines whether a previously generated descriptor is available for a descriptor location selected by the descriptor location determiner 530. If the descriptor availability controller 540 determines that a previously generated descriptor is available for a descriptor location, the descriptor availability controller 540 retrieves a previous descriptor for the descriptor location. In some examples, one previous descriptor is retrieved by the descriptor availability controller 540. In other examples, multiple previous descriptors are retrieved. In examples disclosed herein, the most recent previous descriptor is retrieved. However, any other methods to determine the descriptors to retrieve may additionally and/or alternatively be used.

In examples discussed herein, the descriptor availability controller 540 retrieves the most recent previous descriptor corresponding to a descriptor location. For example, if a first prior descriptor and a second prior descriptor exist for the descriptor location 270, and the first prior descriptor was generated before the second prior descriptor, the descriptor availability controller 540 may retrieve the second prior descriptor. However, any other methods to select a previous descriptor may additionally or alternatively be used. In some examples, the selection of a previous descriptor by the descriptor availability controller 540 may include sampling weather (e.g., temperature, humidity, pressure, etc.) local to the descriptor location in addition to the current time. For example, if the weather recorded in the first prior descriptor more accurately corresponds to the current weather of the descriptor location than the weather recorded in the second prior descriptor, the descriptor availability controller 540 may retrieve the first prior descriptor.

The descriptor availability controller 540 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The descriptor generator 550 generates a descriptor for the descriptor location. Further details regarding the creation of a descriptor can be found in the discussion of FIG. 6. The descriptor generator 550 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the descriptor generator 550 implements means for generating a descriptor.

The descriptor similarity generator 560 calculates a similarity value using the current descriptor and the previous descriptor. A first descriptor may be compared to a second descriptor in order to determine whether the environment has changed, such as the piano 266 moving to another location in the living room 230. In order to compare a first and a second descriptor, the audio signal response may be recorded in the same location.

In examples disclosed herein, the descriptor similarity generator 560 calculates a distance value from the current descriptor and the previous descriptor using a manifold learning model. However, other methods to calculate similarity between the current descriptor and the previous descriptor may additionally and/or alternatively be used. An equation to represent a calculation of a similarity value at a descriptor location i is described in the following equation:

$$\Delta_{i,j}[<\Psi_i(t_j),\tau_j,\varrho_j,\zeta_j>,<\Psi_i(t_{j+1}),\tau_{j+1},\varrho_{j+1},\zeta_{j+1}>] \rightarrow \delta \in R^+ \quad \text{(Equation 1)}$$

where $\Delta_{i,j}$ is a manifold machine learning model function given a first descriptor and a second descriptor, $<\Psi_i(t_j), \tau_j, \varrho_j, \zeta_j>$ is the first descriptor at a first time j, and $<\Psi_i(t_{j+1}), \tau_{j+1}, \varrho_{j+1}, \zeta_{j+1}>$ is the second descriptor at a second time j+1, $\delta$ is the similarity value, or distance between the first descriptor and the second descriptor, output by the machine learning model, $\Psi_i(t_j)$ is the encoded chirp response at time j, $\tau_j$ is a temperature recorded in an environment at the first time j, $\varrho_j$ is the pressure recorded in an environment at the first time j, $\zeta_j$ is the relative humidity recorded in an environment at the first time j, $\Psi_i(t_{j+1})$ is the encoded chirp response at the second time j+1, $\tau_{j+1}$ is a temperature recorded in an environment at the second time j+1, $\varrho_j$ is the pressure recorded in an environment at the second time j+1, and $\zeta_{j+1}$ is the relative humidity recorded in an environment at the second time j+1. The output of the machine learning model $\delta \in R^+$ can include any number of dimensions. In the example illustrated by Equation 1, the first descriptor and the second descriptor are represented as tuples of four elements. However, any other structure to represent the descriptors may additionally or alternatively be used. The descriptor similarity generator 560 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the descriptor similarity generator 560 implements means for comparing.

The physical change indicator 570 indicates whether a physical change in the environment 100 has been detected. If the similarity value calculated by the descriptor availability controller 540 does not exceed a similarity threshold, the physical change indicator 570 indicates that a physical change in the environment has been detected. In some examples, the indication of a physical change may be a Boolean flag value. In other examples, the indication of a physical change may be an interrupt signal sent to an external controller (e.g., the housekeeping controller 120). The physical change indicator 570 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the physical change indicator 570 implements means for indicating.

In the illustrated example of FIG. 5, the local datastore 580 stores the topological map produced by the topological map controller 515, the descriptors generated by the descriptor generator 550, and the model used by the descriptor similarity generator 560. However, other data may additionally and/or alternatively be stored by the local datastore 580. The local datastore 580 of the illustrated example of FIG. 5 is implemented by any memory, storage device and/or storage disc for storing data such as, for example, flash memory, magnetic media, optical media, solid state memory, hard drive(s), thumb drive(s), etc. Furthermore, the data stored in the local datastore 580 may be in any data format such as, for example, binary data, comma delimited data, tab delimited data, structured query language (SQL) structures, etc. While, in the illustrated example, the local datastore 580 is illustrated as a single device, the local datastore 580 and/or any other data storage devices described herein may be implemented by any number and/or type(s) of memories.

Figure 6:
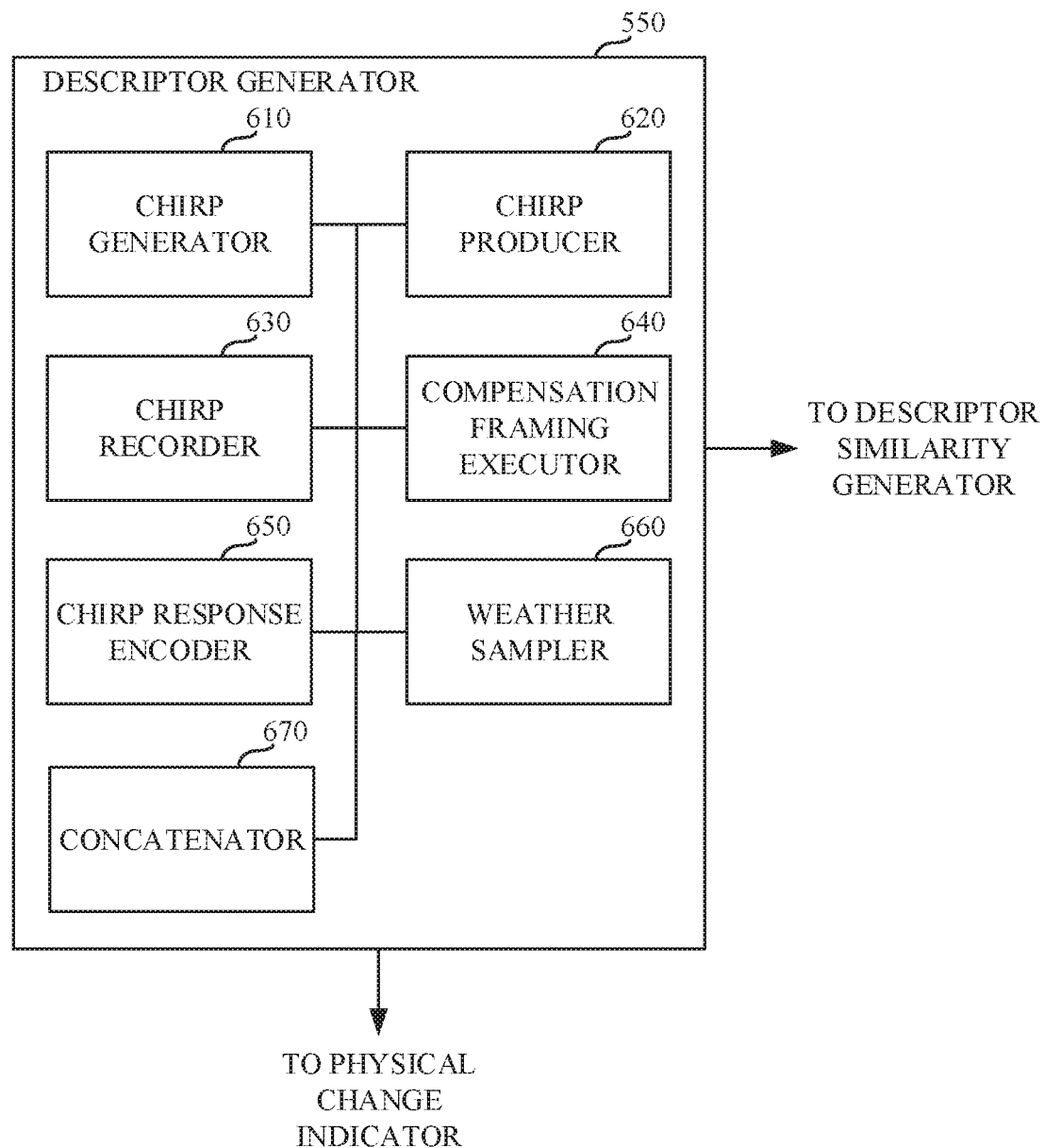
FIG. 6 is a block diagram of an example descriptor generator to create descriptors of an environment.

FIG. 6 is a block diagram of an example descriptor generator 550 to create descriptors of an environment. The descriptor generator 550 of FIG. 6 includes an example chirp generator 610, an example chirp producer 620, an example chirp recorder 630, an example compensation framing executor 640, an example chirp response encoder 650, an example weather sampler 660, and an example concatenator 670. In some examples, the descriptor generator 550 implements means for generating.

The chirp generator 610 generates a chirp to be produced in the environment 100. In examples disclosed herein, a chirp is generated such that the chirp may transmit sound at diverse frequency bands during a period of time. The frequency bands may vary during the period of the chirp signal. The modulation of the frequency bands may be used to create spectral gaps in the chirp signal. In some examples, one chirp is generated to be produced in an environment. In other examples, multiple chirps are generated. In further examples, factors of chirp generation include the attainable frequencies reproducible by the physical change detector 110, frequencies unable to disturb nearby people, frequencies not known to produce fractures on nearby objects, and/or frequencies that do not resemble spoken languages. The chirp generator 610 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The chirp producer 620 emits the chirp signal generated by the chirp generator 610 into the environment 100. In some examples, a single chirp is emitted into an environment 100. In other examples, multiple chirps are emitted into the environment 100. The chirp producer 620 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the chirp producer 620 implements means for causing.

The chirp recorder 630 captures the chirp after the chirp reflections from objects 102, 104, 106 in the environment 100. The chirp recorder 630 may use transducers external to the descriptor generator 550 to capture the chirp, such as transducers 130 or microphones. In examples disclosed herein, the chirp is recorded and captured at one location (e.g., with one microphone). In other examples, the chirp may be captured at multiple locations (e.g., with two microphones, three microphones, etc.). The chirp recorder 630 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the chirp recorder 630 implements means for recording.

The compensation framing executor 640 executes a compensation framing process on the signal captured by the chirp recorder 630. In examples disclosed herein, the compensation framing process includes a signal subtraction to reconstruct the captured sound relative to the position of a chirp producer (e.g., a speaker) to the position of a chirp recorder (e.g., a microphone). However, any other methods for compensation framing may additionally and/or alternatively be used. In some examples, if a captured chirp is determined to be abnormal, or the captured chirp has a deviation from previous chirp captures that exceeds a deviation threshold, the chirp signal may be re-produced by the chirp producer 620 and re-captured by the chirp recorder 630. The compensation framing executor 640 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the compensation framing executor 640 implements means for framing.

The chirp response encoder 650 converts the captured signal into an encoded form. In examples disclosed herein, the chirp response encoder 650 first executes a sliding window frequency decomposition transformation (e.g., Fast Fourier Transform, Discrete Cosine Transform, etc.) on the captured signal to convert the capture into the frequency domain. However, any other method to pre-process the captured chirp before converting the signal into an encoded form may additionally and/or alternatively be used. For example, a normalization pre-process method may be used to map complex values to real floating-point values, or a compression method may be used to distribute portions of the captured signal.

As previously mentioned, the chirp response encoder model may be an auto-encoder neural network with an undercomplete topology. The auto-encoder may be a deep learning model with convolutional neurons. In some examples, the chirp response encoder is trained using a recorded chirp. The recorded chirp is supplied to the model as an input and as the desired output. The chirp response encoder 650 generates a chirp recording deviation. The chirp recording deviation corresponds to whether the recorded chirp response deviates from previous chirp recordings. For example, if a person in an environment began speaking while a chirp was emitted into the environment, the recorded response may deviate significantly from other chirp responses recorded shortly beforehand. In some examples, the deviation may correspond to a similarity between multiple chirp responses. For example, if a first chirp, a second chirp, and a third chirp are each emitted within a brief time period, a deviation of the encoding of the second chirp from the encoding of the first chirp and the encoding of the second chirp may exceed a deviation threshold.

The chirp response encoder 650 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the chirp response encoder 650 implements means for encoding.

The weather sampler 660 captures a sample of the weather in the environment 100. In examples disclosed herein, the weather sampler 660 samples the current time, a temperature value, pressure value, and relative humidity value of the environment 100. However, any other metrics of the environment 100 may additionally and/or alternatively be sampled. The weather sampler 660 may use transducers external to the descriptor generator 550 to capture the chirp, such as the transducers 130. The weather sampler 660 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In some examples, the weather sampler 660 implements means for sampling.

The concatenator 670 concatenates the encoded chirp recording with the environment weather sample. In examples disclosed herein, the concatenator combines the encoded chirp recording element with each element of the environment weather sample to create a tuple. However, any other data structures or methods to combine each element may additionally and/or alternatively be used. The concatenator 670 of the illustrated example of FIG. 6 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

Figure 7:
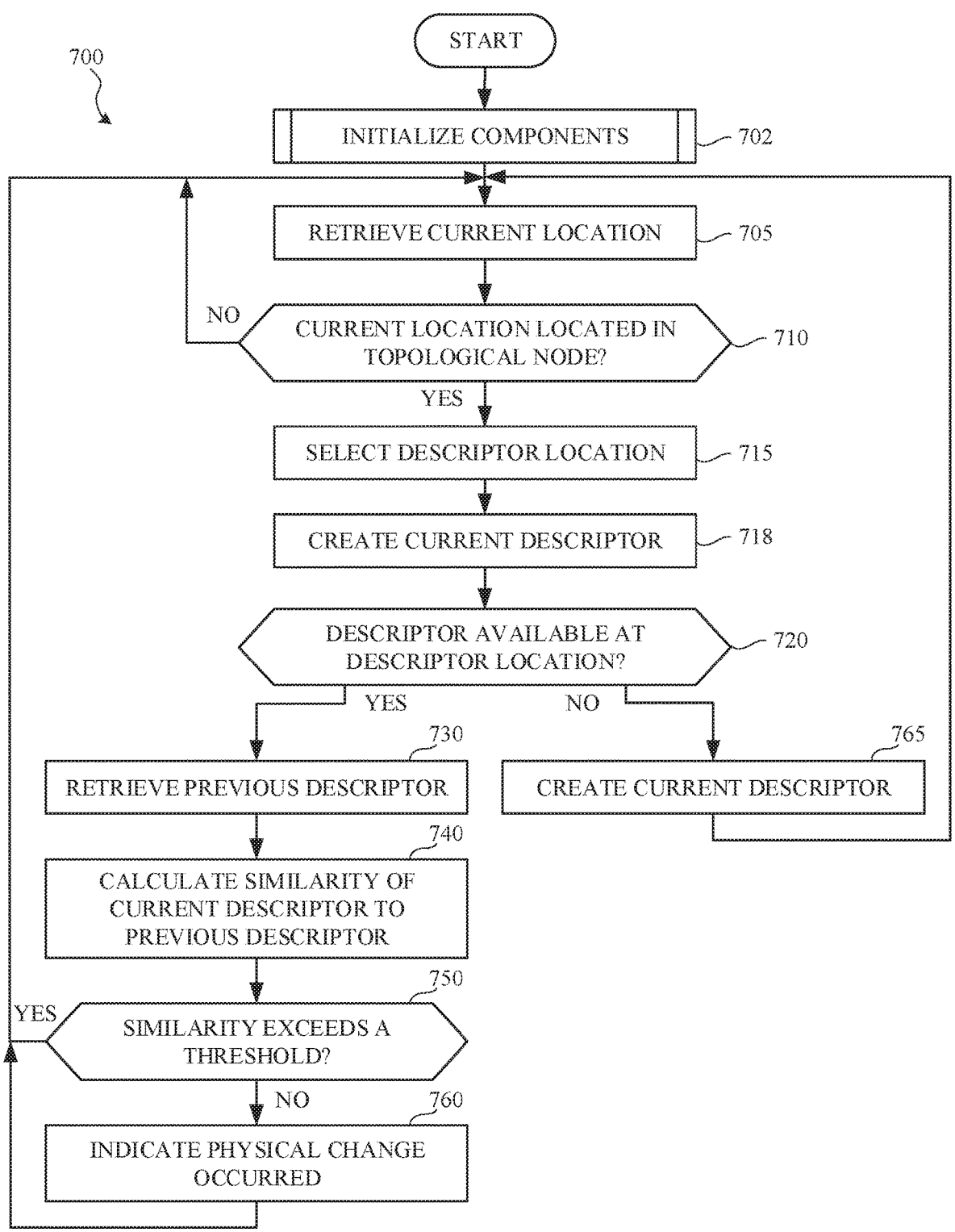
FIG. 7 is a flowchart representative of machine-readable instructions that may be executed to implement the example physical change detector of FIGS. 1 and 4.
Figure 8:
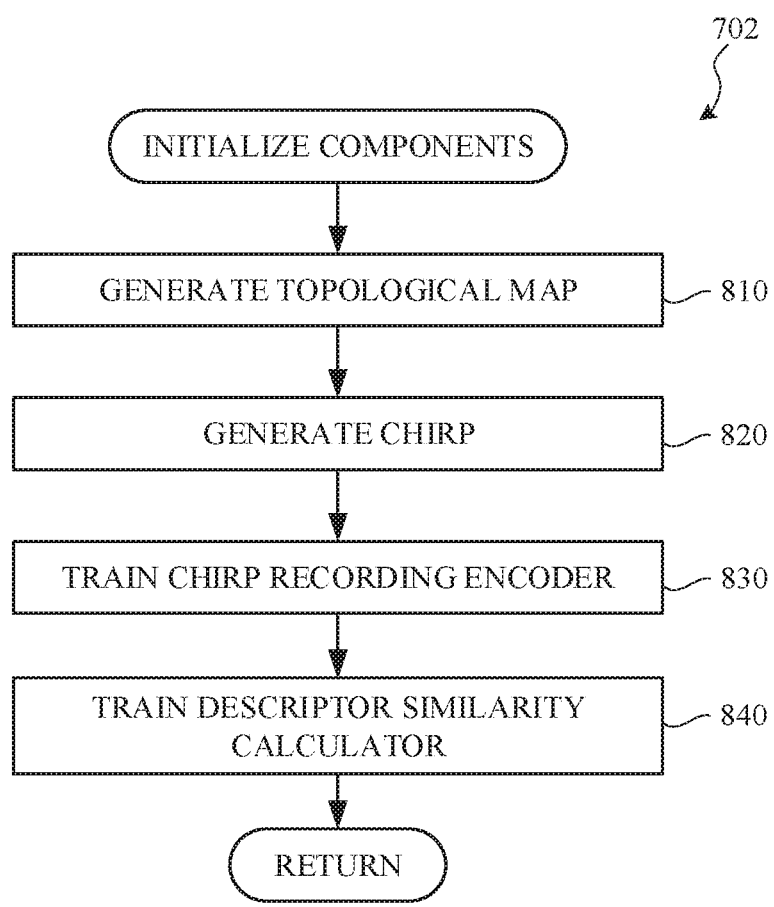
FIG. 8 is a flowchart representative of machine-readable instructions that may be executed to implement the example component initializer of FIG. 5.

While an example manner of implementing the example physical change detector 110 of FIG. 6 is illustrated in FIGS. 7, 8, and/or 9, one or more of the elements, processes and/or devices illustrated in FIGS. 7, 8, and/or 9 may be combined, divided, re-arranged, omitted, eliminated and/or implemented in any other way. Further, the example component initializer 510, the example topological map controller 515, the example indoor location determiner 520, the example descriptor location determiner 530, the example descriptor availability controller 540, the example descriptor generator 550, the example descriptor similarity generator 560, the example physical change indicator 570, and/or, more generally, the example physical change detector of FIG. 5 may be implemented by hardware, software, firmware and/or any combination of hardware, software and/or firmware. Thus, for example, any of the example component initializer 510, the example topological map controller 515, the example indoor location determiner 520, the example descriptor location determiner 530, the example descriptor availability controller 540, the example descriptor generator 550, the example descriptor similarity generator 560, the example physical change indicator 570 and/or, more generally, the example physical change detector 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, component initializer 510, the example topological map controller 515, the example indoor location determiner 520, the example descriptor location determiner 530, the example descriptor availability controller 540, the example descriptor generator 550, the example descriptor similarity generator 560, and/or the example physical change indicator 570 is/are hereby expressly defined to include a non-transitory computer readable storage device or storage disk such as a memory, a digital versatile disk (DVD), a compact disk (CD), a Blu-ray disk, etc. including the software and/or firmware. Further still, the example physical change detector 110 of FIG. 5 may include one or more elements, processes and/or devices in addition to, or instead of, those illustrated in FIGS. 7, 8, and/or 9 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the physical change detector 110 of FIG. 5 is shown in FIGS. 7, 8, and/or 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7, 8, and/or 9, many other methods of implementing the example physical change detector 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart 700 representative of machine-readable instructions that may be executed to implement the example physical change detector of FIGS. 1 and 4. The component initializer 510 initializes components of the physical change detector 110 to default states. (Block 702). In examples disclosed herein, the component initializer instructs the chirp generator 610 to generate a set of chirps to be projected outward into the environment, trains a first machine learning model to encode chirp recordings, and trains a second machine learning model to calculate a similarity between a first descriptor and a second descriptor. However, any other initialization methods or processes can additionally and/or alternatively be used. Further details regarding the initialization process are discussed below in connection with FIG. 8.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used for the first machine learning model. Using a neural network model enables the encoding of chirp recordings. In general, machine learning models/architectures that are suitable to use in the example approaches disclosed herein will be an auto-encoder neural network with an undercomplete topology. An auto-encoder neural network has a symmetric structure with respect to dimensionality at the input and output ends, and in general is utilized to produce an output nearly identical to an input. A neural network with an undercomplete topology has fewer neurons in the central layers compared to layers near the input layer. However, other types of machine learning models could additionally or alternatively be used.

In examples disclosed herein, a manifold learning model is used for the second machine learning model. Using a manifold learning model enables the calculation of similarity between descriptors. In general, machine learning models/architectures that are suitable to use in the example approaches disclosed herein will be an isometric mapping process. However, other types of machine learning models could additionally or alternatively be used (e.g., linear local embedding, self-organizing map, etc.).

In general, implementing a machine learning system involves two phases, a learning/training phase and an inference phase. In the learning/training phase, a training process is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of machine learning model and/or the expected output. For example, supervised training uses inputs and corresponding expected (e.g., labeled) outputs to select parameters (e.g., by iterating over combinations of select parameters) for the machine learning model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the machine learning model (e.g., without the benefit of expected (e.g., labeled) outputs).

In examples disclosed herein, machine learning models are trained using stochastic gradient descent. However, any other training process may additionally or alternatively be used. In examples disclosed herein, training is performed until an acceptable amount of error is achieved. In examples disclosed herein, training is performed at the physical change detector 110. Training is performed using hyperparameters that control how the learning is performed (e.g., a learning rate, a number of layers to be used in the machine learning model, etc.). In some examples re-training may be performed.

Training is performed using training data. In examples disclosed herein, the training data originates from locally generated data. Because unsupervised training is used, the training data is not labeled.

Once training is complete, the models are deployed for use as executable constructs that process an input and provide an output based on the network of nodes and connections defined in the models. The models are stored at the local datastore 580. The models may then be executed by the descriptor generator or the descriptor similarity generator.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Once components have been initialized by the component initializer 510, the indoor location determiner 520 retrieves the current location of the physical change detector 110. (Block 705). In some examples, the current location of the physical change detector 110 is determined using Global Positioning System (GPS) coordinates. In other examples, the current location of the physical change detector 110 is retrieved using dead reckoning. However, any other methods to retrieve the current location of the physical change detector 110 may additionally and/or alternatively be used. In further examples, the service robot 108 may relocate to another position before the indoor location determiner 520 retrieves the current location. For example, the service robot 108 may move to the bedroom 220 to detect changes in the environment 200 after a physical change was detected in the kitchen 210.

The topological map controller 515 determines whether the current location retrieved by the indoor location determiner 520 is located in a node in the topological map. If the topological map controller 515 determines that the current location of the physical change detector 110 is not located in a topological node (e.g., block 710 returns a result of NO), control returns to block 705 to determine the current location of the physical change detector 110.

If the topological map controller 515 determines that the current location of the physical change detector 110 is located in a topological node (e.g., block 710 returns a result of YES), the descriptor location determiner 530 determines a location at which a descriptor may be generated. (Block 715). The service robot 108 moves to the location identified by the descriptor location determiner 530. For example, if the service robot 108 is located in the kitchen 210 and the descriptor location determiner 530 identifies a descriptor location 270, the service robot 108 may move to the location 270 before creating a descriptor (block 718).

In some examples, the descriptor location determiner 530 prioritizes nearby locations that are reachable by the system and locations that are not labeled for special usages. In other examples, the descriptor location determiner 530 selects a descriptor location from a predetermined list of descriptor locations that is nearest to the current location of the physical change detector 110. However, other methods for selecting a descriptor location may additionally and/or alternatively be used. The descriptor generator 550 generates a descriptor for the descriptor location. (Block 718). Further details regarding the creation of a descriptor can be found in the discussion of FIG. 8.

Once a current descriptor has been generated by the descriptor generator 550, the descriptor availability controller 540 retrieves a previous descriptor for the descriptor location. (Block 730). In some examples, one previous descriptor is retrieved by the descriptor availability controller 540. In other examples, multiple previous descriptors are retrieved. In examples disclosed herein, the most recent previous descriptor is retrieved. However, any other methods to determine the descriptors to retrieve may additionally and/or alternatively be used.

In examples discussed herein, the descriptor availability controller 540 retrieves the most recent previous descriptor corresponding to a descriptor location. For example, if a first prior descriptor and a second prior descriptor exist for the descriptor location 270, and the first prior descriptor was generated before the second prior descriptor, the descriptor availability controller 540 may retrieve the second prior descriptor. However, any other methods to select a previous descriptor may additionally or alternatively be used. In some examples, the selection of a previous descriptor by the descriptor availability controller 540 may include sampling weather (e.g., temperature, humidity, pressure, etc.) local to the descriptor location in addition to the current time. For example, if the weather recorded in the first prior descriptor more accurately corresponds to the current weather of the descriptor location than the weather recorded in the second prior descriptor, the descriptor availability controller 540 may retrieve the first prior descriptor.

Once the previous descriptor has been retrieved by the descriptor availability controller 540, the descriptor similarity generator 560 calculates a similarity value using the current descriptor and the previous descriptor. (Block 740). In examples disclosed herein, the descriptor similarity generator 560 calculates a distance value from the current descriptor and the previous descriptor using a manifold learning model. However, other methods to calculate similarity between the current descriptor and the previous descriptor may additionally and/or alternatively be used. In some examples, the descriptor similarity generator 560 implements means for comparing.

If the similarity value calculated by the descriptor availability controller 540 does not exceed a similarity threshold (e.g., block 750 returns a result of NO), the physical change indicator 570 indicates that a physical change in the environment has been detected. (Block 760). In some examples, the indication of a physical change may be a Boolean flag value. In other examples, the indication of a physical change may be an interrupt signal sent to an external controller. In some examples, the physical change indicator 570 implements means for indicating. If the similarity value calculated by the descriptor availability controller 540 exceeds a similarity threshold (e.g., block 750 returns a result of YES), control returns to block 705.

Returning to block 720, if the descriptor availability controller 540 determines that a previously generated descriptor is not available for the descriptor location selected by the descriptor location determiner 530 (e.g., block 720 returns a result of NO), the descriptor generator 550 stores the current descriptor as an initial descriptor for the descriptor location (block 765), and control returns to block 705.

FIG. 8 is a flowchart representative of machine-readable instructions that may be executed to implement the example component initializer of FIG. 5. The topological map controller 515 generates a topological map of an area to be monitored by the example physical change detector 110. (Block 810). In some examples, a map is generated by the physical change detector 110 using Simultaneous Localization and Mapping (SLAM). In other examples, the topological map is loaded via a network protocol such as the Internet.

The component initializer 510 instructs the chirp generator 610 to generate a chirp to be produced in an environment. (Block 820). In examples disclosed herein, a chirp is generated such that the chirp may transmit sound at diverse frequency bands during a period of time. The frequency bands may vary during the period of the chirp. The modulation of the frequency bands may be used to create spectral gaps in the chirp signal. In some examples, one chirp is generated to be produced in an environment. In other examples, multiple chirps are generated. In further examples, factors of chirp generation include the attainable frequencies reproducible by the physical change detector 110, frequencies unable to disturb nearby people, frequencies not known to produce fractures on nearby objects, and/or frequencies that do not resemble spoken languages.

The component initializer 510 trains the example chirp response encoder 650. (Block 830). As previously mentioned, the chirp response encoder model may be an auto-encoder neural network with an undercomplete topology. The auto-encoder may be a deep learning model with convolutional neurons. In some examples, the chirp response encoder is trained using a recorded chirp. The recorded chirp is supplied to the model as an input and as the desired output. In some examples, the auto-encoder model is split at the center into an encoder section and a decoder section, and the encoder section is used as the trained chirp response encoder 650. However, any other methods to train and/or generate a chirp response encoder may additionally and/or alternatively be used. In examples disclosed herein, a chirp response encoder may be trained for every chirp generated by the chirp generator 610. However, any number of chirp response encoders may be used.

The component initializer 510 trains the descriptor similarity generator 560. (Block 840). As previously mentioned, the descriptor similarity generator 560 may be a manifold learning model. However, other types of machine learning models may additionally or alternatively be used (e.g., linear local embedding, self-organizing map, etc.). In some examples, once trained, the descriptor similarity generator 560 calculates a distance value from the current descriptor and the previous descriptor using a manifold learning model. However, other methods to calculate similarity between the current descriptor and the previous descriptor may additionally and/or alternatively be used.

Figure 9:
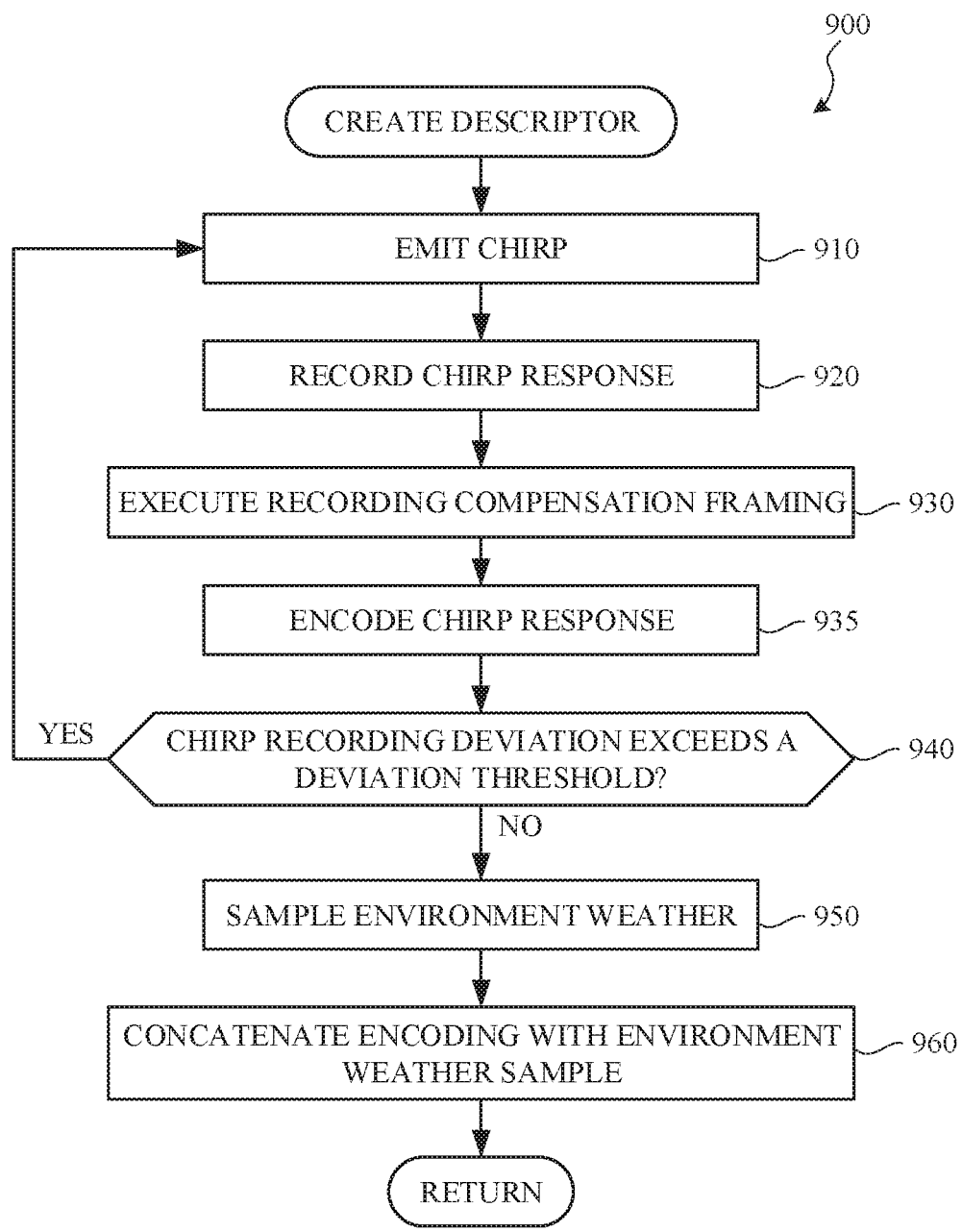
FIG. 9 is a flowchart representative of machine-readable instructions that may be executed to implement the example descriptor generator of FIG. 5.

FIG. 9 is a flowchart representative of machine-readable instructions that may be executed to implement the descriptor generator of FIG. 5. The program 900 of FIG. 9 may implement the machine-readable instructions to create a current descriptor (block 718). The chirp producer 620 emits the chirp signal generated by the chirp generator 610. (Block 910). In some examples, a single chirp is emitted into an environment. In other examples, multiple chirps are produced and emitted into the environment. In examples described within, the service robot 108 ensures there are no actors (e.g., humans, pets, other robots) present in the environment before chirps are emitted. The service robot 108 may delay a period of time when actors are identified as present in the environment. In some examples, the chirp producer 620 implements means for causing.

After a chirp has been emitted into an environment by the chirp producer 620, the chirp recorder 630 captures the chirp after the chirp bounces off the environment. (Block 920). The chirp recorder 630 may use transducers external to the descriptor generator 550 to capture the chirp, such as transducers 130 or microphones. In examples disclosed herein, the chirp is recorded and captured at one location (e.g., with one microphone). In other examples, the chirp may be captured at multiple locations (e.g., with two microphones, three microphones, etc.). In some examples, the chirp recorder 630 implements means for recording.

The compensation framing executor 640 executes a compensation framing process on the signal captured by the chirp recorder 630. (Block 930). In examples disclosed herein, the compensation framing process includes a signal subtraction to reconstruct the captured sound relative to the position of a chirp producer (e.g., a speaker) to the position of a chirp recorder (e.g., a microphone). In other words, a recording of the chirp response after the compensation framing is a representative approximation of the sound received by the transducers 130 despite a relative proximity to the source (e.g., speakers) of the chirp emission. However, any other methods for compensation framing may additionally and/or alternatively be used. In some examples, if a captured chirp is determined to be abnormal, or the captured chirp has a deviation from previous chirp captures that exceeds a deviation threshold, the chirp signal may be re-produced by the chirp producer 620 and re-captured by the chirp recorder 630. In some examples, the compensation framing executor 640 implements means for framing.

The chirp response encoder 650 converts the captured signal into an encoded form. (Block 935). In examples disclosed herein, the chirp response encoder 650 first executes a sliding window frequency decomposition transformation (e.g., Fast Fourier Transform, Discrete Cosine Transform, etc.) on the captured signal to convert the capture into the frequency domain. However, any other method to pre-process the captured chirp before converting the signal into an encoded form may additionally and/or alternatively be used. For example, a normalization pre-process method may be used to map complex values to real floating-point values, or a compression method may be used to distribute portions of the captured signal.

As previously mentioned, the chirp response encoder model may be an auto-encoder neural network with an undercomplete topology. The auto-encoder may be a deep learning model with convolutional neurons. In some examples, the chirp response encoder is trained using a recorded chirp. The recorded chirp is supplied to the model as an input and as the desired output.

In examples disclosed herein, the chirp response encoder model includes firing sparsity such that for a given input, the encoded representation output includes fewer dimensions with larger excitation values than the input. The chirp response encoder model may also include a manifold structural metric such that a first input and a second input with similar content will have a corresponding first encoding and second encoding, where the first and second encodings will be similar according to a metric function (e.g., a distance between the two encoding representations). However, any other characteristics of the chirp response encoder model may additionally and/or alternatively be used.

In some examples, the auto-encoder model is split at the center into an encoder section and a decoder section, and the encoder section is used as the trained chirp response encoder 650. However, any other methods to train and/or generate a chirp response encoder may additionally and/or alternatively be used. In examples disclosed herein, a chirp response encoder may be trained for every chirp generated by the chirp generator 610. However, any number of chirp response encoders may be used.

The chirp response encoder 650 generates a chirp recording deviation. The chirp recording deviation corresponds to whether the recorded chirp response deviates from previous chirp recordings. For example, if a person in an environment began speaking while a chirp was emitted into the environment, the recorded response may deviate significantly from other chirp responses recorded shortly beforehand. In some examples, the deviation may correspond to a similarity between multiple chirp responses. For example, if a first chirp, a second chirp, and a third chirp are each emitted within a brief time period, a deviation of the encoding of the second chirp from the encoding of the first chirp and the encoding of the second chirp may exceed a deviation threshold. If the chirp response encoder 650 determines that a chirp recording deviation exceeds a deviation threshold (e.g., block 940 returns a value of YES), control returns to the chirp producer to re-emit the chirp. (Block 910). In some examples, the chirp response encoder 650 implements means for encoding.

Once the captured chirp has been encoded by the example chirp response encoder 650, the weather sampler 660 captures a sample of the environment weather. (Block 950). In examples disclosed herein, the weather sampler 660 samples the current time, a temperature value, pressure value, and relative humidity value of the environment 100. However, any other metrics of the environment 100 may additionally and/or alternatively be sampled. The weather sampler 660 may use transducers external to the descriptor generator 550 to capture the chirp, such as the transducers 130 in the service robot 108 but external to the physical change detector 110. In some examples, the weather sampler 660 implements means for sampling.

The concatenator 670 concatenates the encoded chirp recording with the environment weather sample. (Block 960). In examples disclosed herein, the concatenator combines the encoded chirp recording element with each element of the environment weather sample to create a tuple. However, any other data structures or methods to combine each element may additionally and/or alternatively be used.

Figure 10:
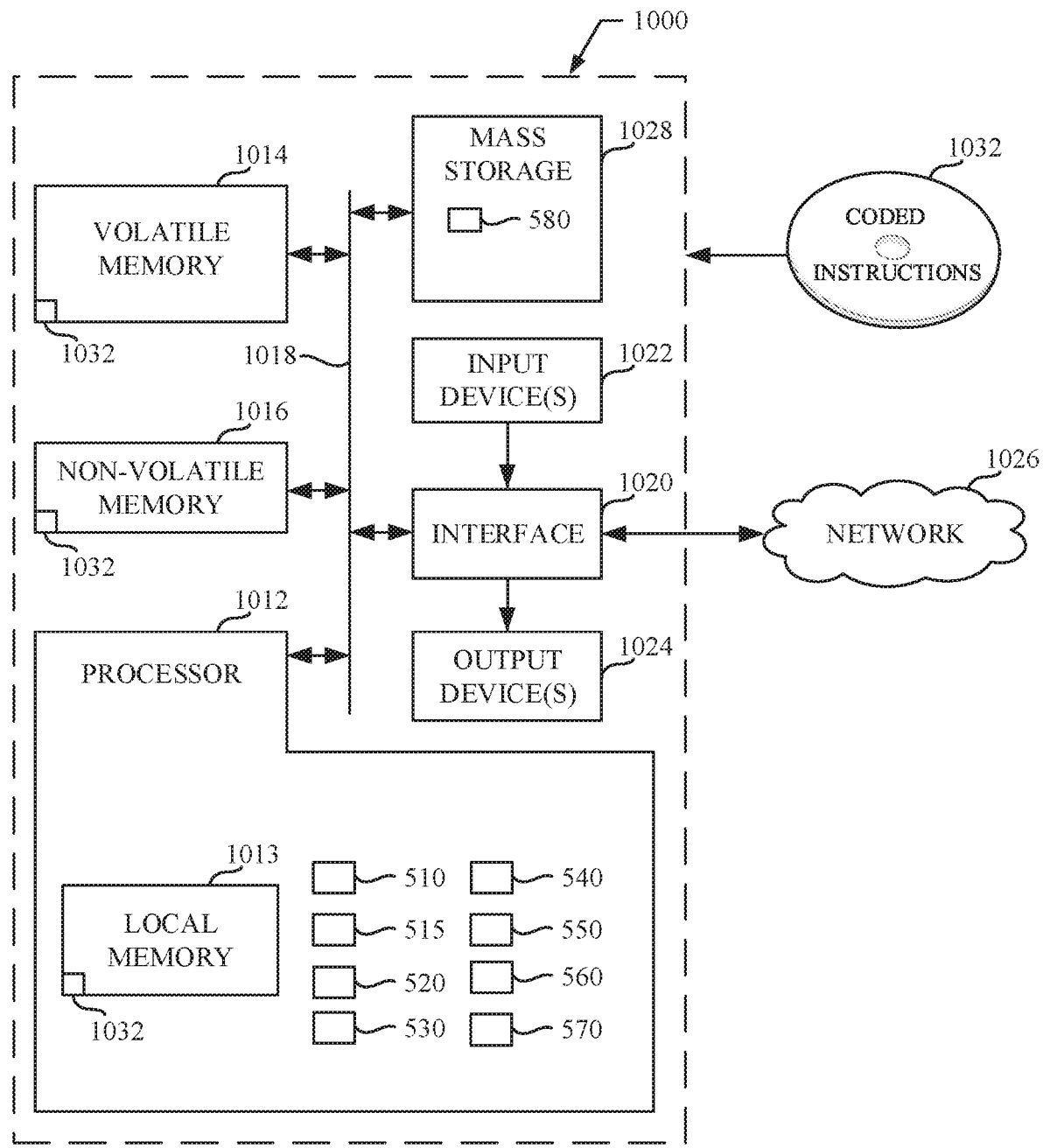
FIG. 10 is a block diagram of an example processing platform structured to execute the instructions of FIGS. 7, 8, and/or 9 to implement the example physical change detector of FIG. 5.

FIG. 10 is a block diagram of an example processor platform 1000 structured to execute the instructions of FIGS. 7, 8, and/or 9 to implement the example physical change detector 110 of FIG. 5. The processor platform 1000 can be, for example, a server, a personal computer, a workstation, a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the component initializer 510, the indoor location determiner 520, the descriptor location determiner 530, the descriptor availability controller 540, the descriptor generator 550, the descriptor similarity generator 560, and the physical change indicator 570.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 7, 8, and/or 9 may be stored in the mass storage device 1028, in the volatile memory 1014, in the non-volatile memory 1016, and/or on a removable non-transitory computer readable storage medium such as a CD or DVD.

Example methods, apparatus, systems, and articles of manufacture to detect changes in a physical environment are disclosed herein. Further examples and combinations thereof include the following:

Example 1 includes an apparatus to detect a physical change in an environment, the apparatus comprising a descriptor generator to generate a first descriptor, the descriptor generator including a chirp producer to emit a chirp into the environment, a chirp recorder to record a response to the chirp from the environment, and a chirp response encoder to generate an encoding of the response to the chirp, a descriptor similarity generator to generate a similarity value, the similarity value to compare the first descriptor to a second descriptor, and a physical change indicator to, in response to the similarity value exceeding a similarity threshold, indicate that a physical change has occurred in the environment.

Example 2 includes the apparatus of example 1, wherein the chirp response encoder includes using an auto-encoder neural network to generate the encoding.

Example 3 includes the apparatus of example 2, wherein the auto-encoder neural network has an undercomplete topology.

Example 4 includes the apparatus of example 1, wherein the chirp response encoder is further to emit a second chirp, record a second response to the second chirp from the environment, and generate a second encoding of the second response to the second chirp.

Example 5 includes the apparatus of example 4, wherein the response is a first response, the chirp is a first chirp, and wherein the chirp response encoder further includes a first auto-encoder neural network to encode the first response to the first chirp and a second auto-encoder neural network to encode the second response to the second chirp.

Example 6 includes the apparatus of example 1, further including a compensation framing executor to execute a compensation framing process on the response to the chirp, the compensation framing to compensate for a distance between a source of the chirp and a location of the recording of the response to the chirp.

Example 7 includes the apparatus of example 1, wherein the descriptor generator is further to determine whether a deviation of a first encoding of a first chirp response from a second encoding of a second chirp response exceeds a deviation threshold and, in response to determining that the deviation exceeds the deviation threshold, record a third chirp response and generate a third encoding, the third encoding corresponding to the third chirp response.

Example 8 includes the apparatus of example 1, wherein the descriptor generator is further to include a weather sampler to sample weather in the environment including a current time, a temperature value, a relative humidity value, and a pressure value.

Example 9 includes a method of detecting a physical change in an environment, the method comprising generating, by executing an instruction with a processor, a first descriptor, the generating including emit a chirp into the environment, recording a response to the chirp from the environment, and generating an encoding of the response to the chirp, generating, by executing an instruction with the processor, a similarity value, the similarity value to compare the first descriptor to a second descriptor, and in response to the similarity value exceeding a similarity threshold, indicating, by executing an instruction with the processor, that a physical change has occurred in the environment.

Example 10 includes the method of example 9, wherein the generating an encoding includes using an auto-encoder neural network.

Example 11 includes the method of example 10, wherein the auto-encoder neural network has an undercomplete topology.

Example 12 includes the method of example 9, wherein the generating an encoding includes emitting a second chirp, recording a second response to the second chirp from the environment, and generating a second encoding of the second response to the second chirp.

Example 13 includes the method of example 12, wherein the response is a first response, the chirp is a first chirp, and wherein the generating an encoding includes a first auto-encoder neural network to encode the first response to the first chirp and a second auto-encoder neural network to encode the second response to the second chirp.

Example 14 includes the method of example 9, further including framing the response to the chirp, the framing to compensate for a distance between a source of the chirp and a location of the recording of the response to the chirp.

Example 15 includes the method of example 9, further including determining whether a deviation of a first encoding of a first chirp response from a second encoding of a second chirp response exceeds a deviation threshold and, in response to determining that the deviation exceeds the deviation threshold, recording a third chirp response and generate a third encoding, the third encoding corresponding to the third chirp response.

Example 16 includes the method of example 9, wherein the generating a first descriptor further includes sampling weather in the environment, the sampling weather including sampling a current time, a temperature value, a relative humidity value, and a pressure value.

Example 17 includes at least one non-transitory computer readable medium comprising instructions that, when executed, cause at least one processor to at least generate a first descriptor, cause a chirp to be emitted into an environment, record a response to the chirp from the environment, generate an encoding of the response to the chirp, generate a similarity value, the similarity value to compare the first descriptor to a second descriptor, and in response to the similarity value exceeding a similarity threshold, indicate that a physical change has occurred in the environment.

Example 18 includes the at least one non-transitory computer readable medium of example 17, wherein the instructions, when executed, cause the at least one processor to generate an encoding including using an auto-encoder neural network.

Example 19 includes the at least one non-transitory computer readable medium of example 18, wherein the auto-encoder neural network has an undercomplete topology.

Example 20 includes the at least one non-transitory computer readable medium of example 17, wherein the instructions, when executed, cause the at least one processor to cause a second chirp to be emitted into the environment, record a second response to the second chirp from the environment, and generate a second encoding of the second response to the second chirp.

Example 21 includes the at least one non-transitory computer readable medium of example 20, wherein the response is a first response, the chirp is a first chirp, and wherein the instructions, when executed, cause the at least one processor to use a first auto-encoder neural network to encode the first response to the first chirp and a second auto-encoder neural network to encode the second response to the second chirp.

Example 22 includes the at least one non-transitory computer readable medium of example 17, wherein the instructions, when executed, further cause the at least one processor to execute a compensation framing process on the response to the chirp, the compensation framing to compensate for a distance between a source of the chirp and a location of the recording of the response to the chirp.

Example 23 includes the at least one non-transitory computer readable medium of example 17, wherein the instructions, when executed, further cause the at least one processor to determine whether a deviation of a first encoding of a first chirp response from a second encoding of a second chirp response exceeds a deviation threshold and, in response to determining that the deviation exceeds the deviation threshold, to record a third chirp response and generate a third encoding, the third encoding corresponding to the third chirp response.

Example 24 includes the at least one non-transitory computer readable medium of example 17, wherein the instructions, when executed, further cause the at least one processor to sample weather in the environment including a current time, a temperature value, a relative humidity value, and a pressure value.

Example 25 includes an apparatus to detect a physical change in an environment, the apparatus comprising means for generating to generate a first descriptor, the means for generating including means for causing to cause a chirp to be emitted into the environment, means for recording to record a response to the chirp from the environment, and means for encoding to generate an encoding of the response to the chirp, means for comparing to generate a similarity value, the similarity value to compare the first descriptor to a second descriptor, and means for indicating to indicate that a physical change has occurred in the environment.

Example 26 includes the apparatus of example 25, wherein the means for encoding is to use an auto-encoder neural network to generate the encoding.

Example 27 includes the apparatus of example 26, wherein the auto-encoder neural network has an undercomplete topology.

Example 28 includes the apparatus of example 25, wherein the means for encoding is to cause a second chirp to be emitted, record a second response to the second chirp from the environment, and generate a second encoding of the second response to the second chirp.

Example 29 includes the apparatus of example 28, wherein the response is a first response, the chirp is a first chirp, and wherein the means for encoding is further to use a first auto-encoder neural network to encode the first response to the first chirp and a second auto-encoder neural network to encode the second response to the second chirp.

Example 30 includes the apparatus of example 25, further including means for framing to execute a compensation framing process on the response to the chirp, the compensation framing to compensate for a distance between a source of the chirp and a location of the recording of the response to the chirp.

Example 31 includes the apparatus of example 25, wherein the means for generating is further to determine whether a deviation of a first encoding of a first chirp response from a second encoding of a second chirp response exceeds a deviation threshold and, in response to determining that the deviation exceeds the deviation threshold, record a third chirp response and generate a third encoding, the third encoding corresponding to the third chirp response.

Example 32 includes the apparatus of example 25, further including means for sampling to sample weather in the environment including a current time, a temperature value, a relative humidity value, and a pressure value.

From the foregoing, it will be appreciated that example methods, apparatus and articles of manufacture have been disclosed that detect changes in an environment that involve translucent, reflective, and/or complex surfaces and objects that cannot be easily perceived with vision sensors. The disclosed methods, apparatus and articles of manufacture improve the efficiency of using a computing device by determining changes to an environment audio descriptor rather than using computationally intense computer vision methods to detect changes in an environment. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to detect a physical change in an environment, the apparatus comprising:
at least one memory;
computer readable instructions; and
at least one processor to execute the computer readable instructions to at least:
determine a first location for a first descriptor, the first descriptor including an encoded response of the environment to an audio signal;
generate the first descriptor for the first location, the first descriptor generated by:
emitting the audio signal into the environment;
recording a response to the audio signal from the environment; and
generating an encoding of the response to the audio signal;
generate a similarity value, the similarity value to compare the first descriptor to a second descriptor, the first descriptor and the second descriptor including a local weather of the environment in which the response to the audio signal is recorded; and
in response to the similarity value exceeding a similarity threshold, indicate that a physical change has occurred in the environment.

2. The apparatus of claim 1, wherein the at least one processor is to generate the encoding using an auto-encoder neural network.

3. The apparatus of claim 2, wherein the auto-encoder neural network has an undercomplete topology.

4. The apparatus of claim 1, wherein the at least one processor is to emit a second audio signal, record a second response to the second audio signal from the environment, and generate a second encoding of the second response to the second audio signal.

5. The apparatus of claim 4, wherein the response is a first response, the audio signal is a first audio signal, and wherein the at least one processor is to encode the first response to the first audio signal using a first auto-encoder neural network and encode the second response to the second audio signal using a second auto-encoder neural network.

6. The apparatus of claim 1, wherein the at least one processor is to execute a compensation framing process on the response to the audio signal, the compensation framing to compensate for a distance between a source of the audio signal and a location of the recording of the response to the audio signal.

7. The apparatus of claim 1, wherein the at least one processor is to determine whether a deviation of a first encoding of a first audio signal response from a second encoding of a second audio signal response exceeds a deviation threshold and, in response to determining that the deviation exceeds the deviation threshold, record a third audio signal response and generate a third encoding, the third encoding corresponding to the third audio signal response.

8. The apparatus of claim 1, wherein the at least one processor is further to include a weather sampler to sample weather in the environment including a current time, a temperature value, a relative humidity value, and a pressure value.

9. The apparatus of claim 1, wherein the at least one processor is to generate the similarity value based on a manifold learning model with an isometric mapping process.

10. A method of detecting a physical change in an environment, the method comprising:
determining, by executing an instruction with a processor, a first location for a first descriptor, the first descriptor including an encoded response of the environment to an audio signal;
generating, by executing an instruction with the processor, the first descriptor, the generating including:
emitting the audio signal into the environment;
recording a response to the audio signal from the environment; and
generating an encoding of the response to the audio signal;
generating, by executing an instruction with the processor, a similarity value, the similarity value to compare the first descriptor to a second descriptor, the first descriptor and the second descriptor including a local weather of the environment in which the response to the audio signal is recorded; and
in response to the similarity value exceeding a similarity threshold, indicating, by executing an instruction with the processor, that a physical change has occurred in the environment.

11. The method of claim 10, wherein the generating an encoding includes using an auto-encoder neural network.

12. The method of claim 11, wherein the auto-encoder neural network has an undercomplete topology.

13. The method of claim 10, wherein the generating an encoding includes emitting a second audio signal, recording a second response to the second audio signal from the environment, and generating a second encoding of the second response to the second audio signal.

14. The method of claim 13, wherein the response is a first response, the audio signal is a first audio signal, and wherein the generating an encoding includes a first auto-encoder neural network to encode the first response to the first audio signal and a second auto-encoder neural network to encode the second response to the second audio signal.

15. The method of claim 10, further including framing the response to the audio signal, the framing to compensate for a distance between a source of the audio signal and a location of the recording of the response to the audio signal.

16. The method of claim 10, further including determining whether a deviation of a first encoding of a first audio signal response from a second encoding of a second audio signal response exceeds a deviation threshold and, in response to determining that the deviation exceeds the deviation threshold, recording a third audio signal response and generate a third encoding, the third encoding corresponding to the third audio signal response.

17. The method of claim 10, wherein the generating a first descriptor further includes sampling weather in the environment, the sampling weather including sampling a current time, a temperature value, a relative humidity value, and a pressure value.

18. At least one non-transitory computer readable medium comprising instructions that, when executed, cause at least one processor to at least:
determine a first location for a first descriptor, the first descriptor including an encoded response of an environment to an audio signal;

generate the first descriptor;

cause the audio signal to be emitted into the environment;

record a response to the audio signal from the environment;

generate an encoding of the response to the audio signal;

generate a similarity value, the similarity value to compare the first descriptor to a second descriptor, the first descriptor and the second descriptor including a local weather of the environment in which the response to the audio signal is recorded; and in response to the similarity value exceeding a similarity threshold, indicate that a physical change has occurred in the environment.

19. The at least one non-transitory computer readable medium of claim 18, wherein the instructions, when executed, cause the at least one processor to generate an encoding including using an auto-encoder neural network.

20. The at least one non-transitory computer readable medium of claim 19, wherein the auto-encoder neural network has an undercomplete topology.

21. The at least one non-transitory computer readable medium of claim 18, wherein the instructions, when executed, cause the at least one processor to cause a second audio signal to be emitted into the environment, record a second response to the second audio signal from the environment, and generate a second encoding of the second response to the second audio signal.

22. The at least one non-transitory computer readable medium of claim 21, wherein the response is a first response, the audio signal is a first audio signal, and wherein the instructions, when executed, cause the at least one processor to use a first auto-encoder neural network to encode the first response to the first audio signal and a second auto-encoder neural network to encode the second response to the second audio signal.

23. The at least one non-transitory computer readable medium of claim 18, wherein the instructions, when executed, further cause the at least one processor to execute a compensation framing process on the response to the audio signal, the compensation framing to compensate for a distance between a source of the audio signal and a location of the recording of the response to the audio signal.

24. The at least one non-transitory computer readable medium of claim 18, wherein the instructions, when executed, further cause the at least one processor to determine whether a deviation of a first encoding of a first audio signal response from a second encoding of a second audio signal response exceeds a deviation threshold and, in response to determining that the deviation exceeds the deviation threshold, to record a third audio signal response and generate a third encoding, the third encoding corresponding to the third audio signal response.

25. The at least one non-transitory computer readable medium of claim 18, wherein the instructions, when executed, further cause the at least one processor to sample weather in the environment including a current time, a temperature value, a relative humidity value, and a pressure value.

26. An apparatus to detect a physical change in an environment, the apparatus comprising:

means for determining a first location for a first descriptor, the first descriptor including an encoded response of the environment to an audio signal;

means for generating to generate the first descriptor, the means for generating including:

means for causing to cause the audio signal to be emitted into the environment;

means for recording to record a response to the audio signal from the environment; and means for encoding to generate an encoding of the response to the audio signal;

means for comparing to generate a similarity value, the similarity value to compare the first descriptor to a second descriptor, the first descriptor and the second descriptor including a local weather of the environment in which the response to the audio signal is recorded; and means for indicating to indicate that a physical change has occurred in the environment.

\* \* \* \* \*